United States Patent
Yoshikawa

[11] 3,811,541
[45] May 21, 1974

[54] APPARATUS FOR ATTACHING A CENTER PULL TYPE BRAKE TO A BICYCLE

[75] Inventor: Junihiko Yoshikawa, Soka, Japan

[73] Assignee: Kabushiki Kaisha Yoshikawa Seisakusho, Tokyo, Japan

[22] Filed: Aug. 7, 1972

[21] Appl. No.: 278,704

[30] Foreign Application Priority Data
Mar. 31, 1972  Japan.............................. 47-37242
Mar. 31, 1972  Japan.............................. 47-37243

[52] U.S. Cl. ............................ 188/206 R, 188/24
[51] Int. Cl. .............................................. B62l 1/14
[58] Field of Search ................... 188/2 D, 24, 206 R

[56] References Cited
UNITED STATES PATENTS
2,160,181    5/1939    Taylor................................. 188/24

FOREIGN PATENTS OR APPLICATIONS
835,450    9/1938    France .................. 188/24
964,404    1/1950    France .................. 188/24
438,316    11/1935   Great Britain ......... 188/24
500,024    2/1939    Great Britain ......... 188/24
524,472    8/1940    Great Britain ......... 188/24

Primary Examiner—Duane A. Reger
Attorney, Agent, or Firm—Eric H. Waters

[57] ABSTRACT

To support a pivotable rod, bearing a brake shoe, on a branch of the front fork of a bicycle, a clamp is provided consisting of two parts, one of which is formed of bent sheet metal especially shaped to hold a bolt on which said pivotal rod is supported.

5 Claims, 6 Drawing Figures

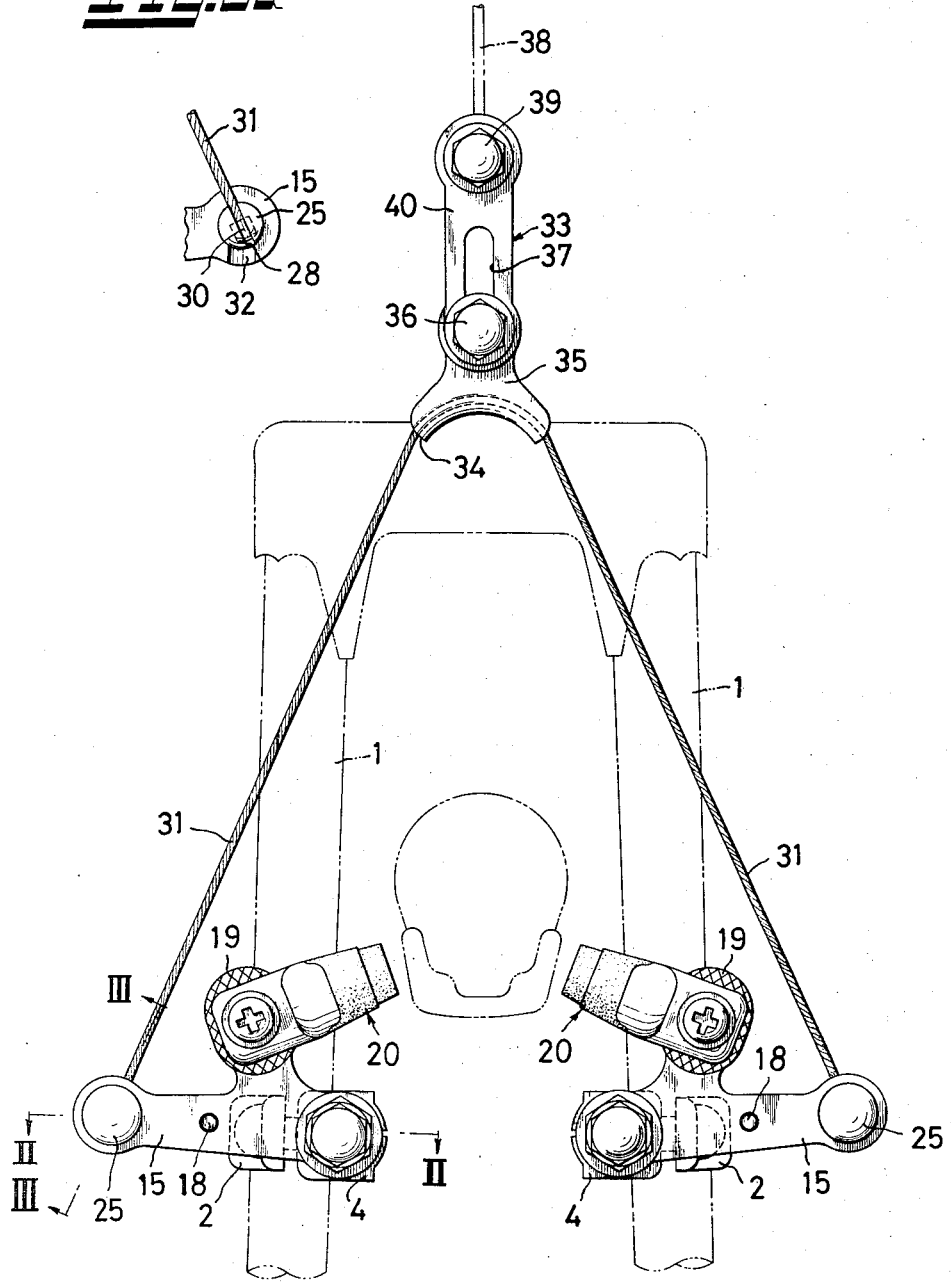

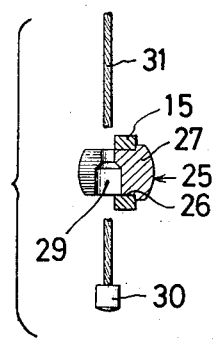
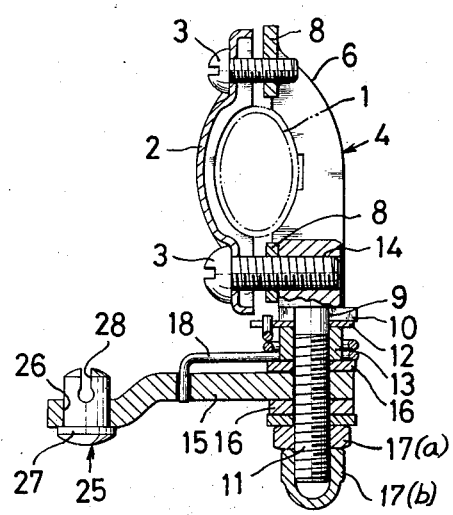
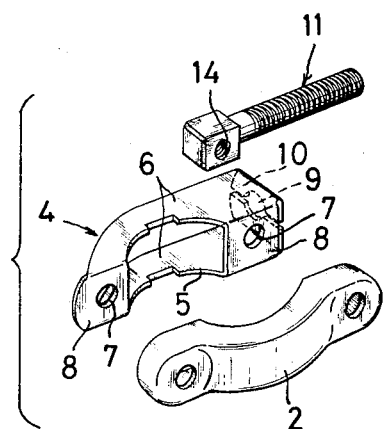
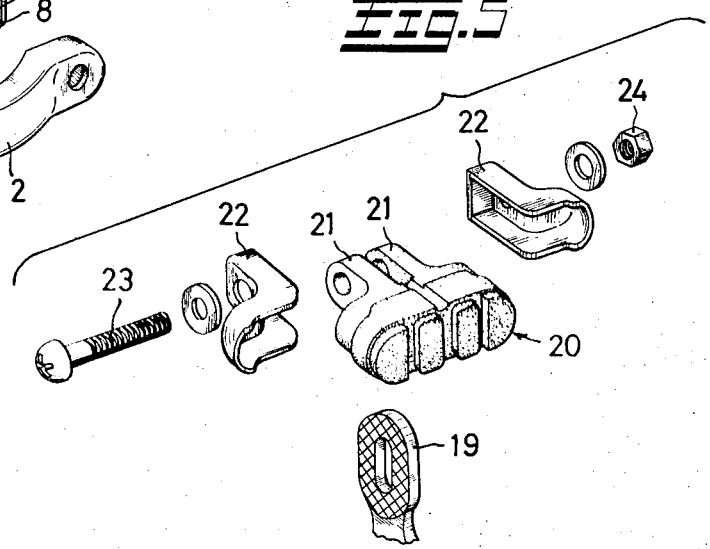

APPARATUS FOR ATTACHING A CENTER PULL TYPE BRAKE TO A BICYCLE

FIELD OF INVENTION

This invention relates to an apparatus for attaching a center pull type brake to a bicycle.

BACKGROUND

It has been conventional in the above-identified kind of apparatus, for a brake operation rod attaching member, which is to be fixed to the front fork of a bicycle in order to hold the front fork along with a clamping member to be formed with a large thickness and by casting. This is due to the fact that an attaching bolt for rotatably supporting the operation rod must project therefrom. This is disadvantageous in that the weight thereof is increased; however, if the weight is descreased, a firm connection of the attaching bolt cannot be obtained.

SUMMARY OF INVENTION

This invention has as an object the provision of an attaching apparatus wherein a brake operation rod attaching member is formed with light weight and out of sheet metal and such that a tight mounting of an attaching bolt can be obtained.

In accordance with the invention there is provided for use on a branch of the front fork of a bicycle apparatus comprising a rod with a brake shoe on this rod and a clamp for clamping onto the aforesaid branch, said clamp including a shaped sheet metal part having in part the profile of said branch, there being furthermore provided pivot means supported by the sheet metal part and in turn pivotally supporting said rod.

According to a feature of the invention the aforesaid rod is provided wth a hole and there is included a member extending through said hole and provided with a two-step bore wherein the steps are of larger and smaller diameters and the larger step extends partly within said rod, there being furthermore provided an operation wire extending into the smaller step and a head on said wire accommodated in the larger step and trapped in the latter by said rod.

A further feature of the invention is the provision of a slit in the rod to admit the aforesaid head into the larger step.

According to an important feature of the invention there is comprised by the aforesaid clamp a clamp part cooperating with said sheet metal part to embrace said branch and means connecting the clamp and sheet metal part to lock the same to said branch.

According to an especially important characteristic feature of the invention the sheet metal part includes spaced flat lug members having edges with the profile of part of said branch, said lug members being in spaced parallel relationship and at least substantially coplanar bridge members perpendicular to and connecting the lug members at opposite extremities of the latter, there being furthermore provided end members extending perpendicular to said lug members, said end members being at least generally co-planar and cooperatively defining a hole through which extends the aforesaid pivot means.

A further feature of the inventon is that said pivot means includes a bolt including a generally cube shaped head accommodated between said lug members, bridge members and end members.

A further feature of the invention is that one of the aforesaid bridge members and the latter said head are provided with aligned holes there being provided means extending through the latter said holes for locking the head in position.

As will be seen hereinafter still another feature of the invention is the connecting means by which the brake shoe is connected to the aforesaid rod.

The clamp part for supporting the brake device pivotally on a branch of the front fork of a bicycle is forked by a method comprising bending a piece of sheet metal into spaced parallel lug members having edges shaped in correspondence with a part of the profile of said branch and connected at their extremities by coplanar bridges, and then bending the extremities into coplanar members perpendicular to the lug members and bridges.

Other objects and features of the invention will be found in the descripton which follows hereinafter.

BRIEF DESCRIPTION OF DRAWING

The invention will now be explained with reference to an embodying example as shown on the accompanying drawings:

FIG. 1 is a front view of an embodiment of this invention;

FIG. 2 is a cross-sectional view taken along line II — II in FIG. 1;

FIG. 3 is an exploded cross-sectional view taken along line III — III in FIG. 1;

FIG. 3a is a rear side view of the parts shown in FIG. 3 in assembled condition;

FIG. 4 is an exploded perspective view of an attaching member portion of said embodiment; and FIG. 5 is an exploded perspective view of a shoe portion of said embodiment.

DETAILED DESCRIPTION

Components 1 are the front fork branches of a bicycle. A brake operation rod attaching member 4 is fixedly attached to the side of each fork branch 1 by means of fastening bolts 3 (FIG. 2) to hold the fork branch 1 along with a clamping member 2.

This attaching member 4 is prepared by the bending of a single piece of sheet metal into such a form that, as shown in FIG. 4, it has a pair of flat upper and lower lug members 6 having concave edges 5 adapted about the side surface of a fork branch 1. Member 4 also includes opposite coplanar side bridge members 8, each having a threaded opening 7 adapted to be in threaded engagement with the aforementioned fastening bolts 3. Member 4 also has end members 10 in perpendicular relationship in coplanar relationship and having an insertion opening 9 through which an attaching bolt 11 is inserted.

The attaching bolt 11, which is inserted through the opening 9 of the attaching member 4, is fastened to the member 4 by means of a nut 13 (FIG. 2) along with an engaging member 12 for a return spring 18. The head portion bolt 11, which is in the form of a cube, is provided with a threaded opening 14 which is in threaded engagement with one of the bolts 3.

Element 15 (FIGS. 1 and 2) is an operation rod (one for each fork branch), which is rotatably supported at one end by the attaching bolt 11 with washers 16 and lock nuts 17(a) and 17(b) and is urged downwards by the return spring 18 applied between rod 15 and the engaging member 12. Each rod 15 is provided at the upper edge of the middle portion thereof with a projecting member 19 which supports a brake shoe 20.

As shown clearly in FIG. 5, the shoe 20 has a pair of holding members 21 projecting from the rear surface thereof to straddle projecting member 19. Members 21 are connected to the projecting member 19 by means of a bolt 23 and a nut 24 by means of protecting members 22 covering the holding members 21.

Component 25 is a wire engaging member, which member is loosely mounted in an opening 26 made in the other end of each operation rod 15. Member 25 is formed at one end into an enlarged stopper portion 27 and is provided at its other end with a slit 28 with a stepped opening 29 passing therethrough in the axial direction thereof. The opening 29 is so formed that nearly a half of the peripheral portion thereof is hidden within the opening 26.

A pull-up wire 31, having an enlarged end 30 for engaging in the opening 29, is arranged to be inserted through a cut-out portion 32 which is made in the operation rod 15 to be positioned angularly to the pulling direction of the wire 31 as clearly shown in FIG. 3a.

Element 33 is a pull-up member, which member comprises a lower member 35 having an engaging portion 34 for engaging the wire 31 and an upper member 40 having at its lower portion a groove 37, in which the foregoing member 35 is adjustably connected by a fastening bolt 36. Member 40 has at its upper portion a securing screw 39 for securing an operation wire 38 connected to a brake lever (not shown).

Thus, according to this invention, the attaching member 4 is formed by bending a single piece of sheet metal to form the lug members 6, the bridge members 8 and the end member 10 in right-angle relationships, so that member 4 is strong in spite of being made of sheet metal. The attaching bolt 11, connected to the member 4, is in the form of a cube at its head portion and is engaged at its head portion by the members 6, 8 and 10 from three directions due to which it can not be rotated. Additionally, the head portion is fixed by the fastening bolt 3 to fasten the member 4, also in a direction at a right angle to the longitudinal direction of the member 4, so that it can be firmly connected.

What is claimed is:

1. For use on a branch of the front fork of a bicycle, apparatus comprising a rod, a brake shoe on said rod, a clamp for clamping onto said branch, said clamp including a shaped sheet metal part having in part the profile of said branch, and pivot means supported by the sheet metal part and in turn pivotally supporting said rod; said clamp comprising a clamp part cooperating with said sheet metal part to embrace said branch, and means connecting the clamp and sheet metal parts to lock the same to said branch; said sheet metal part including spaced flat lug members having edges with the profile of part of said branch, said lug members being in spaced parallel relation, at least substantially coplanar bridge members perpendicular to and connecting the lug members at opposite extremities of the latter, and end members extending perpendicular to said lug members, said end members being at least generally coplanar and cooperatively defining a hole through which extends said pivot means; said pivot means including a bolt including a generally cube-shaped head accomodated between said lug members, bridge members and end members.

2. Apparatus as claimed in claim 1, wherein said rod is provided with a hole, comprising a member extending through said hole and provided with a two-step bore wherein the steps are of larger and smaller diameters and the larger step extends partly within said rod, an operation wire extending into the smaller step and a head on said wire accommodated in the larger step and trapped in the latter by said rod.

3. Apparatus as claimed in claim 2, wherein said rod is provided with a slit to admit said head into said larger step.

4. Apparatus as claimed in claim 1, wherein one of said bridge members and the latter said head are provided with aligned holes, comprising means extending through the latter said holes for locking the head in position.

5. Apparatus as claimed in claim 4, comprising connecting means to connect said shoe to said rod.

* * * * *